United States Patent

[11] 3,583,639

| [72] | Inventor | Gail Cornelius<br>Portland, Oreg. |
|---|---|---|
| [21] | Appl. No. | 805,706 |
| [22] | Filed | Mar. 10, 1969 |
| [45] | Patented | June 8, 1971 |
| [73] | Assignee | R. M. Wade & Co.<br>Portland, Oreg. |

[54] WHEEL AND DRIVE MEANS FOR IRRIGATION SPRINKLER SYSTEM
8 Claims, 6 Drawing Figs.

[52] U.S. Cl. .................................................. 239/212,
                                                239/191, 137/344
[51] Int. Cl. ................................................ A01g 25/02
[50] Field of Search .......................................... 239/212,
                                    213, 178, 191, 189, 177; 137/344

[56] References Cited
UNITED STATES PATENTS

| 738,271 | 9/1903 | Astle | 239/213X |
|---|---|---|---|
| 3,101,903 | 8/1963 | Hall | 239/189X |

FOREIGN PATENTS

| 1,118,382 | 7/1968 | Great Britain | 239/212 |

Primary Examiner—Lloyd L. King
Assistant Examiner—Edwin D. Grant
Attorney—Fryer, Tjensvold, Feix, Phillips & Lempio ABSTRACT: A system to turn the wheels upon which a sprinkler pipeline is supported from positions perpendicular to the line, where they serve to move it across a field in a direction normal to its length, to positions parallel to the line, where they enable the line to be towed lengthwise to another field or different location. The wheels are driven by motors through gearing during sprinkling and the gearing is automatically disconnected when the wheels are moved to the position for towing.

PATENTED JUN 8 1971

INVENTOR
GAIL CORNELIUS
BY
Frye Tjensvold Feix Phillips & Lempio
ATTORNEYS

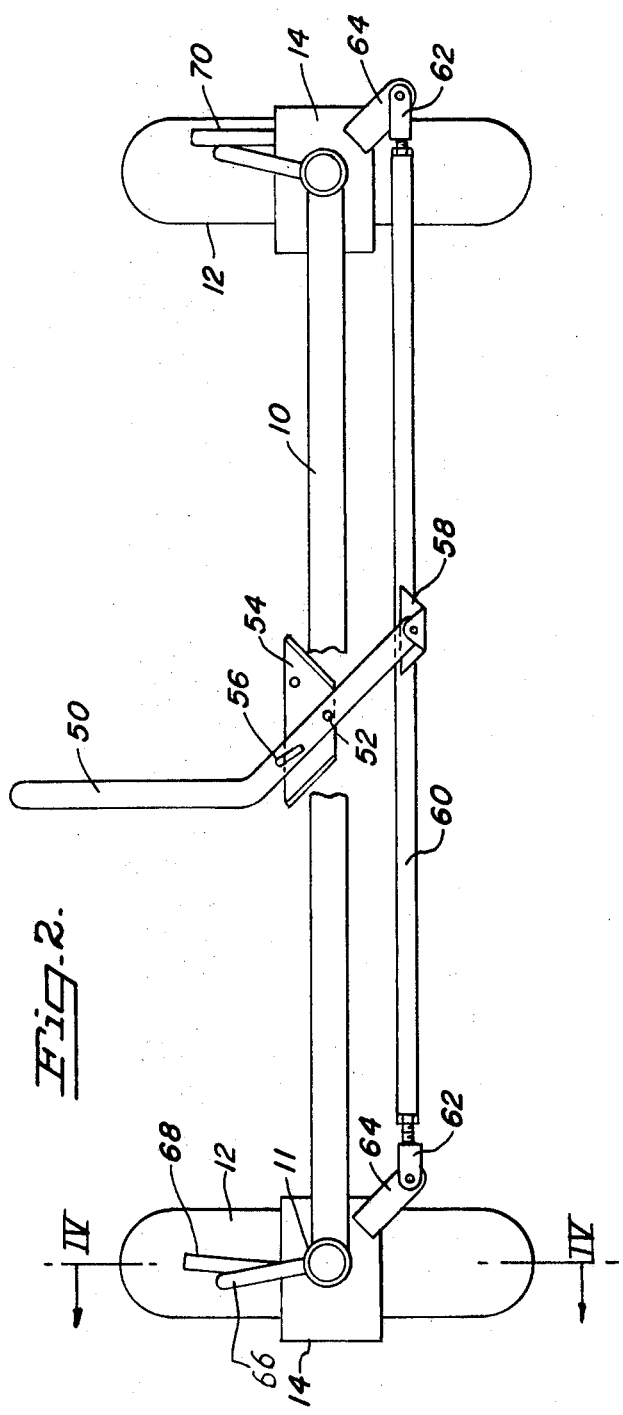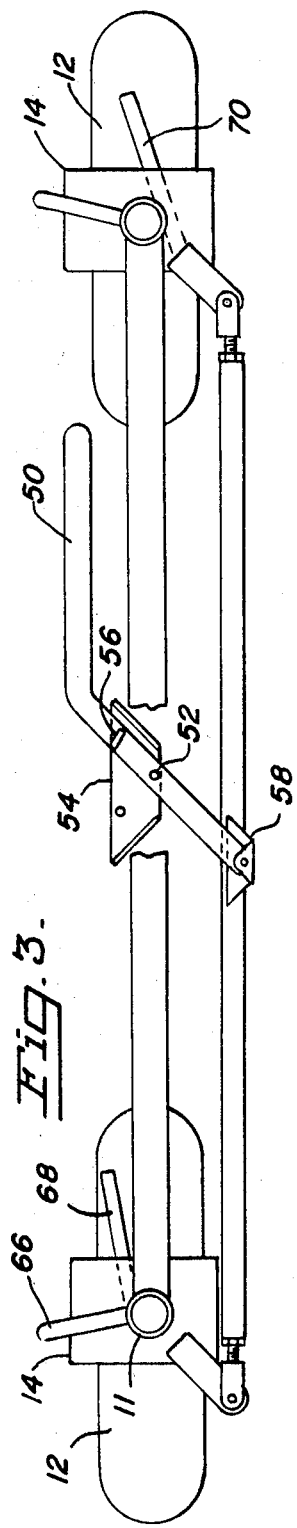

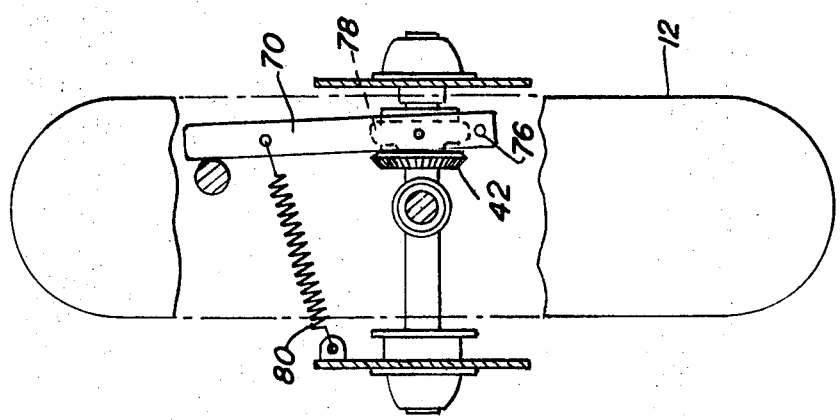
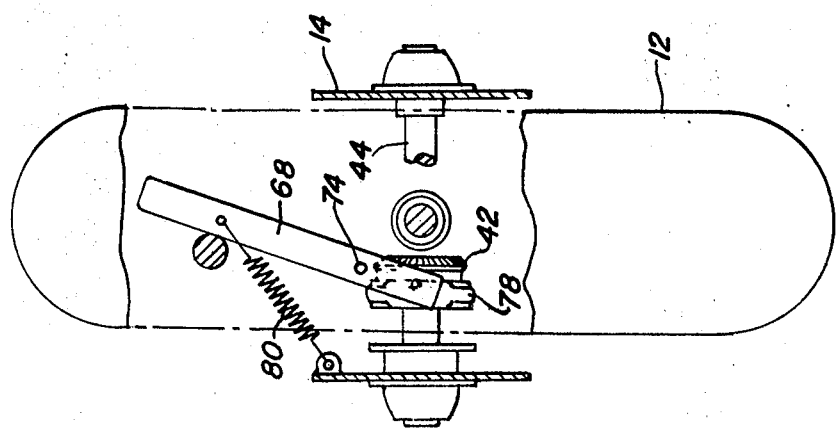
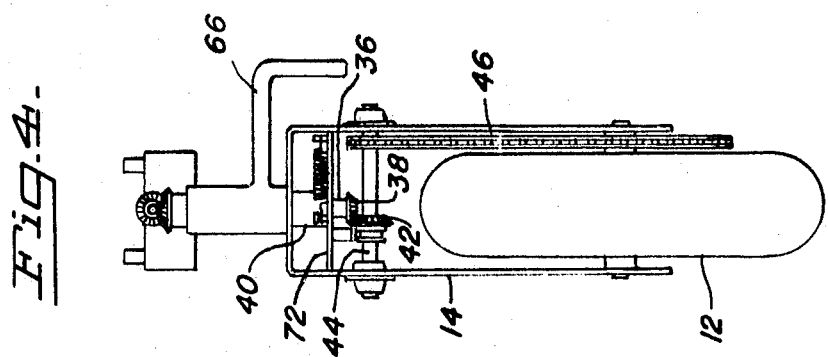

WHEEL AND DRIVE MEANS FOR IRRIGATION SPRINKLER SYSTEM

In the said copending application, a sprinkler line fed by a flexible hose is carried on towers. The towers are of A-shape having a wheel on each leg and supporting a pipe intermediate the ground and the apex. The towers are spaced throughout the length of the pipe and each tower has an associated motor, in this case a water-powered motor, and reduction gearing between the motor and the wheels. In the application mentioned above, the motors also serve as sprinklers to irrigate the ground as the system advances over it, and automatic means control the motors to maintain the line substantially straight and substantially perpendicular to its direction of movement.

The wheels on the towers are disposed parallel to the direction of travel of the system. When the system is moved from one location to another, it is towed from one end of the pipeline. This requires that the wheels first be turned 90° so that they are parallel to the pipe. The present invention pertains particularly to means for turning the wheels and also means for simultaneously and automatically disengaging the wheel drive to enable them to roll freely while the system is being towed.

A better and more complete understanding of the invention will be gained upon reading the following specification wherein reference is made to the accompanying drawings.

In the drawings:

FIG. 2 is a view looking down from the plane II-II of FIG. 1 showing the wheels adjusted to one position;

FIG. 3 is a view like FIG. 2 with the wheels adjusted to the opposite position;

FIG. 4 is a view taken on the line IV-IV of FIG. 2 and illustrating a typical drive to one of the wheels;

FIG. 5 is a fragmentary view with parts in section and parts broken away to shown the construction of a drive gear-disengaging mechanism on one of the wheels; and FIG. 6 is a view like FIG. 5 showing the same drive gear disengaging mechanism which is modified for the other wheel.

Figure 1:
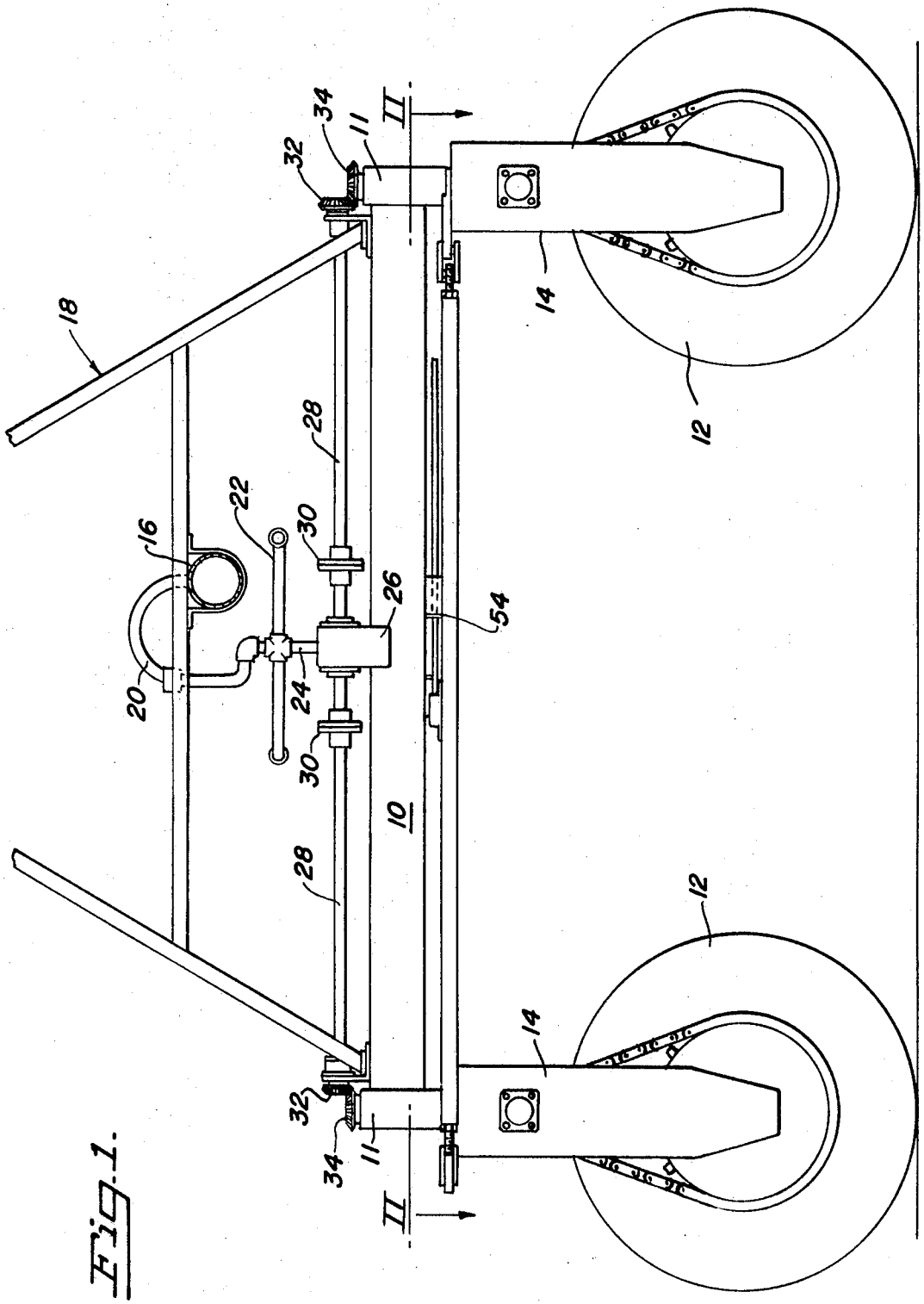
FIG. 1 is a view in side elevation of the lower portion of a sprinkler line supporting tower mounted upon wheels which are driven by a hydraulic motor and sprinkler.

The lower portion of one of the towers which support a pipeline and which is mounted on wheels to enable the pipeline to be advanced over an area to be irrigated is shown in FIG. 1. The body of the device is a rigid beam 10 with bearings 11 at its opposite ends and with wheels 12 mounted in forks 14 which are adapted to swivel about a shaft which extends through the bearings 11 and will be described presently in further detail.

The main irrigation line is carried in an elevated position as shown at 16 on an A-frame generally indicated at 18 which is supported by and rises upwardly to form a tower above the body 10. This frame is suitably guided and carries control mechanism, all of which is described in detail in the copending application referred to above.

During operation of the sprinkler system, the line 16 is charged with water under pressure and at each tower a hose 20 directs the water to a rotatable two-armed sprinkler 22 where it is ejected through suitable orifices in opposite sides of the outer ends of the two arms. This imparts rotation to the sprinkler and causes it to act as a motor for driving the wheels 12. Rotation of the sprinkler rotates a shaft 24 upon which it is supported and, through reduction gearing contained in a gear box 26, drives shafts 28 through flexible couplings 30 which accommodate slight misalignment of the parts. Each of the shafts 28 drives a bevel pinion 32 meshing with a similar pinion 34 on a shaft 36 which extends through one of the bearings 11 and has a bevel pinion 38 at its lower end as best shown in FIG. 4. A bearing 40 in each fork 14, also best shown in FIG. 4, is rotatable upon the shaft 36 to enable adjustment of the positions of the wheels in the manner presently to be described. The pinion 38 last referred to meshes with a pinion 42 slidable on a shaft 44 which extends across the space in the fork above the wheel and which may be moved into and out of engagement with the pinion 38 as will presently appear. The shaft 44 also carries a small sprocket which, through a chain 46, drives a large sprocket fixed to the wheel 12, so that further reduction in the drive ratio is obtained.

The position of the wheels 12 as shown in FIGS. 1 and 3 is that which they will occupy when the sprinkler line is being driven across the field during irrigation. When the system is towed to a new location by a tractor drawing it from one end or the other, the wheels are turned to positions parallel to the pipe as illustrated in FIG. 2. This is accomplished by means of a hand lever 50 pivoted as at 52 to a bracket 54 disposed beneath the main beam 10 (see also FIG. 1) and adapted to be swung from the position shown in FIG. 2 to the position shown in FIG. 3. It is locked in either position by an eye bolt or similar pin 56 which extends through a suitable hole in the lever and either one of two spaced holes in the bracket 54. The opposite end of the lever is pivoted to a bracket 58 on a rod 60, both ends of which have adjustable fittings 62 by means to adjust its length. The ends of the fittings 62 are pivoted to plates 64 rigidly fixed, as by welding, to the tops of the forks 14. Arms 66 extend outwardly and downwardly from the bearings 11 (see FIGS. 2, 3, and 4) and remain stationary during adjustment of the wheels between the two positions in which they are used. Since the arms 66 remain stationary, they may be used for engagement with a lever carried by the moving fork for disengaging the driving gears, thus greatly reducing the resistance of the system to being towed. This is accomplished by mechanism best illustrated in FIGS. 5 and 6 in which levers 68 and 70 are shown. They are pivoted to a plate 72 which is shown only in FIG. 4. Lever 68 has a pivot point 74 and the lever 70 has a pivot point 76. Both levers carry yokes 78 which have bifurcated ends extending into grooves formed in the bevel gears 42 for sliding the gear into and out of engagement as the positions of the wheels are changed. The reason for the different positions of the pivot points 74 and 76 on the levers is to cause movement of the yokes in opposite directions since the gears 42 must both be moved toward the outboard side of the wheel. Suitable springs such as shown at 80 urge the gears 42 toward the gears 38 which drive them so that upon return of the wheels to the positions shown in FIG. 3, the drive train is automatically reestablished.

I claim:

1. In an irrigation system in which a waterline is moved across an area to be irrigated, a plurality of towers spaced along and supporting said waterline, a beam forming an integral part of each said tower and positioned at right angles to the waterline, wheels positioned at the ends of said beams supporting said beams and towers and thereby said waterline, the wheels being selectively adjustable to a first position perpendicular to said waterline to enable it to be moved in a direction normal to its length and wherein the wheel at one end of said beam tracks exactly in the track of the wheel at the other end of said beam, and a second position parallel to said waterline to enable it to be towed lengthwise, and means on each of said towers connecting the wheels thereof for adjusting them simultaneously to either of the sad positions with a single actuating member.

2. The system of claim 1 in which each beam has a bearing adjacent each end thereof, a fork pivotally associated with and extending downwardly from each bearing, a said wheel in each fork, a rod connecting the forks and pivoted to them and a lever for moving the rod to adjust the forks and wheels between said two positions.

3. An irrigation system in which a waterline is moved across an area to be irrigated comprising, spaced towers supporting said line and having wheels adapted to be adjusted between positions perpendicular to the line to enable it to be moved in a direction normal to its length and positions parallel to the line to enable it to be towed lengthwise, means on each of said towers connecting the wheels thereof for adjustment simultaneously with a single actuating member, power drive means for each wheel including gears in mesh when the line is being moved normal to its length, and means to disengage said gears automatically upon adjustment of the wheels for lengthwise movement of the line.

4. An irrigation system in which a waterline is moved across an area to be irrigated comprising, spaced towers supporting said line, each said tower including a beam with a bearing adjacent each end, a fork pivotally associated with and extending from each bearing, a ground-engaging wheel in each fork, a rod connecting the forks and pivoted to them, a lever for moving the rod to adjust the forks and wheels between a first position wherein said wheels are perpendicular to said line and a second position wherein said wheels are parallel to said line, power drive means for each said wheel including a shaft extending downwardly through each bearing, a shaft extending transversely in the fork above the wheel, gears forming a driving connection between said shafts when the wheels are in said first position, means for separating the gears when the wheels are in said second position, and a driving connection between the transverse shaft and the wheel.

5. The system of claim 4 in which the gears are bevel gears one of which is slidable on the transverse shaft, a lever engaging the gear to slide it into and out of mesh with the other gear and a member fixed with respect to the support and engageable by the lever upon pivoted movement of the fork.

6. The system of claim 4 in which the lever is spring biased toward the positions of gear engagement.

7. In an irrigation system in which a waterline is moved across an area to be irrigated including a plurality of towers spaced along and supporting said line and geared drive means on each said tower connected to wheels thereon and wherein said wheels are adapted to be adjusted between a first position perpendicular to the waterline and a second position parallel to the waterline, the improvement comprising means to automatically disengage said geared drive means from each said wheel when said wheels are positioned parallel to said waterline and to automatically engage said geared drive means to each said wheel when the wheels are positioned perpendicular to the waterline.

8. The irrigation system of claim 7 wherein said geared drive means includes at least two pairs of bevel gears and wherein one of said pairs of bevel gears is disengaged upon positioning the wheels parallel to said waterline.